US008861646B2

(12) United States Patent
Kim et al.

(10) Patent No.: US 8,861,646 B2
(45) Date of Patent: Oct. 14, 2014

(54) TERMINAL COMPRISING MULTI-ANTENNAS AND METHOD OF PROCESSING RECEIVED FREQUENCY

(71) Applicant: LG Innotek Co., Ltd., Seoul (KR)

(72) Inventors: Jong Guk Kim, Seoul (KR); Ja Kwon Ku, Seoul (KR); Kyung Suk Kim, Seoul (KR); Seung Taek Woo, Seoul (KR); Jong Chang Lee, Seoul (KR); Jeong Hoon Cho, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/648,056

(22) Filed: Oct. 9, 2012

(65) Prior Publication Data

US 2013/0089167 A1 Apr. 11, 2013

(30) Foreign Application Priority Data

Oct. 10, 2011 (KR) ........................ 10-2011-0103191
Sep. 28, 2012 (KR) ........................ 10-2012-0109537

(51) Int. Cl.
*H04L 27/00* (2006.01)
*H01Q 9/42* (2006.01)
*H01Q 1/24* (2006.01)
*H01Q 21/28* (2006.01)

(52) U.S. Cl.
CPC ................. *H01Q 1/243* (2013.01); *H01Q 9/42* (2013.01); *H01Q 21/28* (2013.01)
USPC ........... 375/316; 375/347; 375/349; 375/267; 343/700; 343/777; 343/822; 343/850; 343/820; 343/852; 343/860; 343/904; 343/913

(58) Field of Classification Search
CPC ......... H01Q 3/26; H01Q 3/28; H01Q 3/2658; H01Q 3/2694; H01Q 3/44; H01Q 3/36; H01Q 3/38; H01Q 3/40; H01Q 21/22
USPC .......... 375/316, 347, 349, 267; 343/700, 777, 343/822, 850, 820, 852, 860, 904, 913
See application file for complete search history.

(56) References Cited

U.S. PATENT DOCUMENTS 7,236,127 B2 * 6/2007 Vaskelainen et al. ......... 342/372
2006/0253290 A1 * 11/2006 Kwon ............................... 705/1
(Continued)

FOREIGN PATENT DOCUMENTS

KR 10-2005-0109004 A 11/2005
KR 10-2008-0091537 A 10/2008
(Continued)

OTHER PUBLICATIONS

Amari, PCT/JP2010/007373, published on Jul. 28, 2011 (the examiner is using US 2012/0007785 Al) as a translating of this PCT document.*

*Primary Examiner* — Siu Lee
(74) *Attorney, Agent, or Firm* — Birch, Stewart, Kolasch & Birch

(57) ABSTRACT

A wireless communication terminal according to the embodiment includes a communication module including a circuit board having a plurality of pins; a shield case antenna overlapping with one side of the circuit board, electrically connected to a part of the pins and including a signal receiving unit; and a signal processing unit for processing the received signals. An antenna matching unit for matching impedance between the signal processing unit and an antenna unit, a phase shifter for controlling a phase of the received signal and an amplitude regulator for adjusting amplitude of the received signal are provided between the signal processing unit and the antenna unit.

10 Claims, 9 Drawing Sheets

(56) References Cited

U.S. PATENT DOCUMENTS

| | | | | |
|---|---|---|---|---|
| 2007/0066234 | A1* | 3/2007 | Lastinger et al. | 455/67.11 |
| 2007/0182634 | A1* | 8/2007 | Yamamoto et al. | 343/700 MS |
| 2009/0315792 | A1* | 12/2009 | Miyashita et al. | 343/742 |
| 2012/0007785 | A1* | 1/2012 | Amari et al. | 343/722 |
| 2012/0194402 | A1 | 8/2012 | Kim | |

FOREIGN PATENT DOCUMENTS

| | | | |
|---|---|---|---|
| KR | 10-2010-0073144 | A | 7/2010 |
| KR | 10-2011-0000191 | A | 1/2011 |

* cited by examiner

TERMINAL COMPRISING MULTI-ANTENNAS AND METHOD OF PROCESSING RECEIVED FREQUENCY

CROSS-REFERENCE TO RELATED APPLICATIONS

The present application claims priority under 35 U.S.C. 119 and 35 U.S.C. 365 to Korean Patent Application Nos. 10-2011-0103191 filed on Oct. 10, 2011 and 10-2012-0109537 filed on Sep. 28, 2012, which are hereby incorporated by references in their entireties.

BACKGROUND

The embodiment relates to a terminal capable of performing MIMO (multi-in multi-out) using a multiple antenna including an array antenna, and a method of improving the communication quality by adjusting the beam pattern and the beam shape with respect to the frequency signal received through the multiple antenna.

Recently, in the case of a wireless communication terminal, at least two antennas are provided in one terminal. In detail, at least two antennas having frequencies different from each other are provided in one terminal for international roaming or to commonly use wireless communication services providing frequencies different from each other. In addition, a plurality of antennas are used for receiving or transmitting wireless signals having the same frequency.

Meanwhile, since the wireless communication terminal is fabricated in a small size with multi-functions, a shield case antenna, in which an antenna is accommodated in a shield case, is used in some modems to ensure a space for installing at least two antennas.

FIG. 1 shows a structure of a communication module employing such a shield case antenna 10.

However, as the size of the wireless communication terminal employing a shield case is diminished, the receive sensitivity of the antenna is gradually lowered. In addition, as the antenna has the multi-functions, the number of signals received in the antenna is increased, so the receive sensitivity of the antenna is lowered. Therefore, a communication module having a small size capable of improving the receive sensitivity and ensuring the frequency bandwidth is required.

SUMMARY

The embodiment provides a terminal capable of improving the communication quality and performing MEMO using a multiple antenna including an array antenna and a processing method thereof.

The embodiment provides a method of improving the communication quality by adjusting the beam pattern and the beam shape with respect to the frequency signal received through a specific antenna from among multiple antennas.

The embodiment provides a structure, in which an impedance matching unit, a phase shifter and an amplitude regulator are provided in a path of a frequency signal received through an antenna of a terminal.

The embodiment provides a structure, in which an impedance matching unit, a phase shifter and an amplitude regulator are provided in parallel in a path of a frequency signal received through an antenna of a terminal.

The embodiment provides a structure, in which an impedance matching unit, a phase shifter and an amplitude regulator are provided in series in a path of a frequency signal received through an antenna of a terminal.

The embodiment provides a structure, in which a phase shifter and an amplitude regulator are provided in series in a path of a frequency signal received through an antenna of a terminal.

The embodiment provides an impedance matching unit, a phase shifter and an amplitude regulator, which are prepared as a pair structure.

According to the embodiment, there is provided a terminal including an array antenna. The terminal includes an antenna unit to receive signals; a signal processing unit to process the signals received through the antenna; a beam direction and shape control unit provided between the antenna unit and the signal processing unit to match an impedance between the antenna unit and the signal processing unit and to control an amplitude and a phase of the signals received through the antenna unit.

In the beam direction and shape control unit, an antenna matching unit, which matches the impedance between the antenna unit and the signal processing unit, a phase shifter, which controls the phase of the signal received through the antenna unit, and an amplitude regulator, which adjusts the amplitude of the signal, are connected with each other in series or in parallel.

According to the embodiment, there is provided a method of processing a signal received through an antenna, the method includes receiving the signal through the antenna; matching an impedance between an antenna unit and a signal processing unit; shifting a phase of the received signal; adjusting an amplitude of the received signal; and processing the received signal by using the signal processing unit.

According to the embodiment, the terminal can perform the MIMO (multi-in multi-out) based on the signal received through the array antenna and can improve the communication quality, such as a receive sensitivity, by adjusting the beam pattern and the beam shape with respect to the frequency signal received through the multiple antenna.

According to the embodiment, the frequency bandwidth can be increased, so that the selection efficiency for the transmitting/receiving frequency can be improved.

According to the embodiment, the impedance is matched by the antenna matching unit provided between the external antenna unit and the signal processing unit so that the frequency signal received through the external antenna can be input into the signal processing unit without generating the reflected wave, thereby improving the receive sensitivity.

According to the embodiment, the phase of the signal can be adjusted by using the phase shifter provided between the external antenna unit and the signal processing unit and the amplitude of the signal can be adjusted by using a resistor when the signal is input into the signal processing unit, thereby improving the reception quality of the signal.

DETAILED DESCRIPTION OF THE EMBODIMENTS

Figure 1:
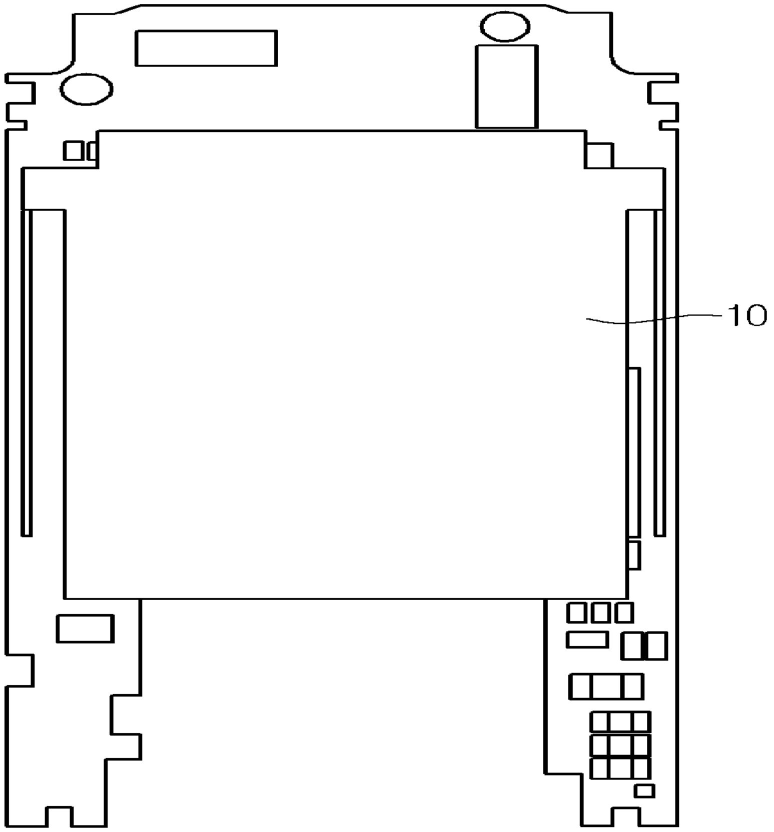
FIG. 1 is a view for explaining a communication module including a shield case antenna.

Hereinafter, the embodiment will be described in more detail with reference to accompanying drawings.

In the following description, the suffix "~module" and "~part" may be used to facilitate the description of the specification and may be compatibly used with each other.

Furthermore, although the embodiment will be described in detail below with reference to accompanying drawings and contents denoted in the drawings, the embodiment is not limited thereto.

Terminologies used in this specification are selected from general terminologies by taking the functions thereof into consideration and they may vary depending on the intentions of operators having ordinary skill in the art, customers and appearance of new technologies. In specific cases, the terminologies may be arbitrarily selected by applicant. In this case, the meaning of the terminologies will be described in corresponding parts of the specification. Accordingly, the terminologies used in this specification should be defined based on the substantial meanings thereof and the whole context throughout the present specification.

In addition, if elements are described as to be connected, coupled and contacted with each other, it may include not only direct connection, but also mechanical connection, electric connection or wired/wireless connection through an intervene structure, media or device.

Figure 2:
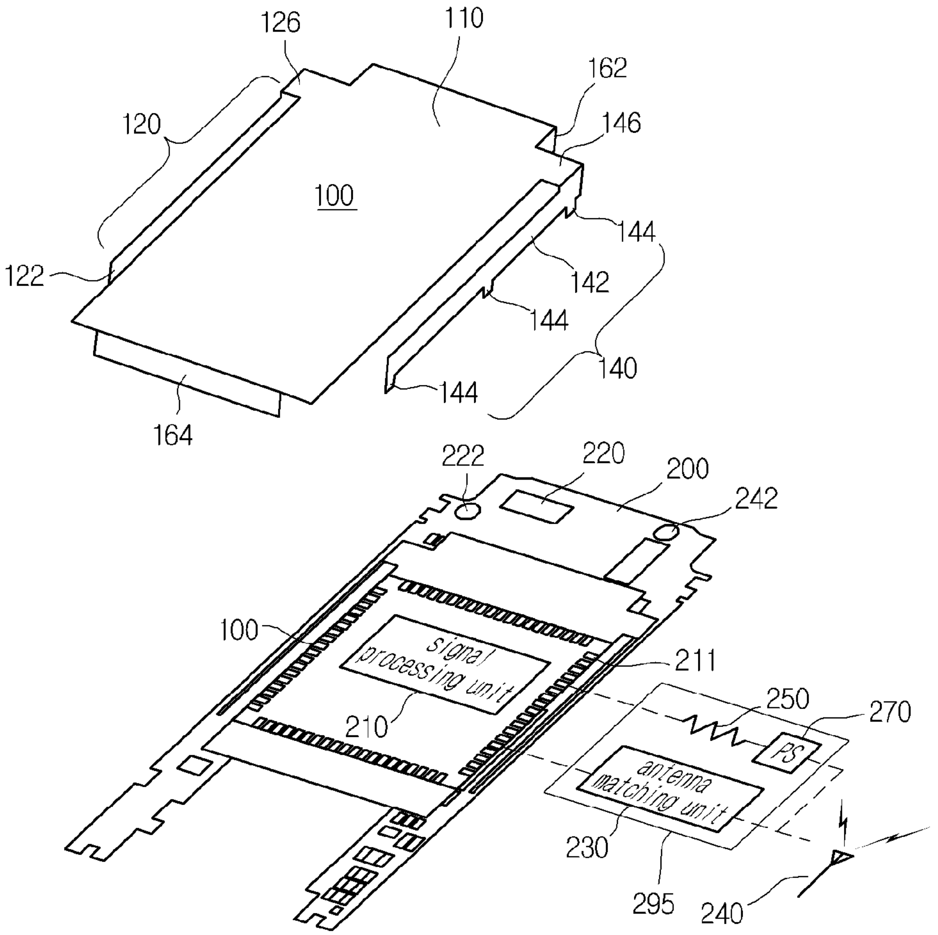
FIG. 2 is an exploded perspective view showing a shield case antenna overlapped with a circuit board in a communication module according to one embodiment.

FIG. 2 is an exploded perspective view showing a shield case antenna 100 overlapped with a circuit board 200 in a communication module according to one embodiment.

The shield case antenna 100 shown in FIG. 2 includes a shield surface 110 for shielding the electromagnetic wave generated from electronic parts, a fixing unit 144 overlapped with the circuit board 200, on which the electronic parts are mounted, and signal receiving units 122 and 142 for receiving signals having desired frequencies. Strip antennas 120 and 140 are symmetrically disposed in opposition to each other about the shield surface 110.

Preferably, the strip antennas are symmetrically configured (line symmetry or surface symmetry) to enable the MIMO, but the strip antennas can also be asymmetrically configured.

As shown in the drawing, the signal receiving units 122 and 142 are made from conductive materials to form strip-shape planes and the fixing unit 144 may protrude from a part of the signal receiving unit 142 of the strip-shape planes. The same structure may be foamed in the strip antenna 120 which is symmetrical to the strip antenna 140. That is, the fixing unit may protrude from a part of the signal receiving unit 122.

In FIG. 2, a plurality of fixing surfaces 162 and 164 are formed at regions where the strip antennas 120 and 140 are not present, and the shield surface 110 overlaps with the circuit board 200 to enhance the stability of overlapping between the shield case and the circuit board 200.

Meanwhile, the strip antenna can be prepared at one of the fixing surfaces 162 and 164 as a pair structure.

The shield surface 110 and the strip antennas 120 and 140 may be integrally formed with each other by using the same conductive sheet metal. In this case, the manufacturing cost can be reduced. In addition, the fixing surfaces 162 and 164 can be integrally formed with the shield surface 110. To this end, a conductive plate may be bent through the punching process.

The shield plate 100 is perpendicular to the signal receiving units 122 and 144 of the strip antennas 120 and 140 as well as to the fixing surfaces 162 and 164, so that the shield surface 110, the strip antennas 120 and 140 and the fixing surfaces 162 and 164 may form the rectangular parallelepiped structure together. The electronic parts mounted on the circuit board 200, which overlaps with the shield case antenna 100, may be located in the rectangular parallelepiped structure.

Feeding points 126 and 146 of the strip antennas 120 and 140 may be formed at connection points between the strip antennas 120 and 140 and the shield surface 110.

The strip antennas 120 and 140 may have sizes different from each other and may transceive the signals having frequency bands different from each other. For instance, the strip antennas 120 and 140 may use the same frequency signal for the wireless LAN of Wibro or LTE (long term evolution), and one of the strip antennas 120 and 140 may be used as an upload antenna and the remaining one of the strip antennas 120 and 140 may be used as a download antenna.

Meanwhile, a signal processing unit 210 may be installed on the circuit board 200 in order to process received signals. In addition, a plurality of metal pins 211 may be installed on the circuit board 200 to electrically connect the shield case antenna 100 with the signal processing unit 210. Further, antennas 220 and 240 can be mounted on the circuit board 200 together with the electronic parts. The antennas 220 and 240 may be disposed out of the shield case antenna 100 to prevent the wireless signals from being shielded by the shield case antenna 100.

The shield case antenna 100 overlaps with the circuit board 200 through the fixing surfaces 162 and 164 and the frequency signals received through the signal receiving units 122 and 142 of the shield case antenna 100 are transmitted to the signal processing unit 210 through predetermined pins.

That is, the signal processing unit includes a plurality of pins 211 serving as connection units. Thus, a signal which is received through the external antenna 240 and impedance-matched is input into a predetermined pin (for instance, $24^{th}$ pin) and at least one of an amplitude and a phase for a signal a signal which is received through the external antenna 240 is controlled and then the signal is input into a predetermined another pin (for instance, $29^{th}$ pin).

In addition, the signal processing unit 210 processes the signal received through the shield case antenna 100 to transmit the signal to another module in the terminal or a controller. To this end, the signal processing unit 210 may include a processor for performing an operation and a memory for storing an operation code to operate the processor.

Referring to the structure shown in FIG. 2, the antennas may include the shield case antenna 100 connected to the circuit board 200, the strip antennas 120 and 140 provided at one side of the shield case antenna 100, and the external antenna unit 240 installed out of the circuit board 200.

A beam direction and shape control unit 295 is provided between the antenna unit 240 and the signal processing unit 210 to match the impedance between the antenna unit 240 and the signal processing unit 210 and to control the amplitude and the phase of the signals received through the antenna unit 240.

The beam direction and shape control unit 295 may include an antenna matching unit 230, a phase shifter 270 and an amplitude regulator 250 for adjusting intensity of the amplitude.

The antenna matching unit 230 matches the impedance between the antenna unit 230 and the signal processing unit to allow the frequency signal received through the external antenna to be input into the signal processing unit without generating the reflected wave.

Preferably, the impedance matching is achieved by adjusting the impedance of the antenna unit on the basis of the signal processing unit.

In addition, the phase is adjusted by the phase shifter and the current is adjusted by a resistor. Thus, the signal having the controlled phase and amplitude can be input into the signal processing unit, so that the reception quality of the signal can be improved.

The phase shifter and the amplitude regulator are connected to each other in series.

As shown in the drawing, preferably, the antenna matching unit, the phase shifter and the amplitude regulator are connected with each other in parallel.

Meanwhile, the antenna matching unit, the phase shifter and the amplitude regulator may be connected with each other in series.

In addition, the antenna unit and the beam direction and shape control unit can be prepared as a pair structure.

According to the embodiment, each antenna may receive the signal having the same frequency characteristic, and it is preferred to provide a terminal capable of performing the MEMO (multi-in multi-out). However, each antenna may receive the signals having frequency characteristics different from each other.

According to another embodiment, the impedance matching unit and the amplitude regulator may be provided in series or parallel in a path of the frequency signal received through the external antenna of the terminal.

According to another embodiment, the impedance matching unit and the phase shifter may be provided in series or parallel in a path of the frequency signal received through the external antenna of the terminal.

Figure 3:
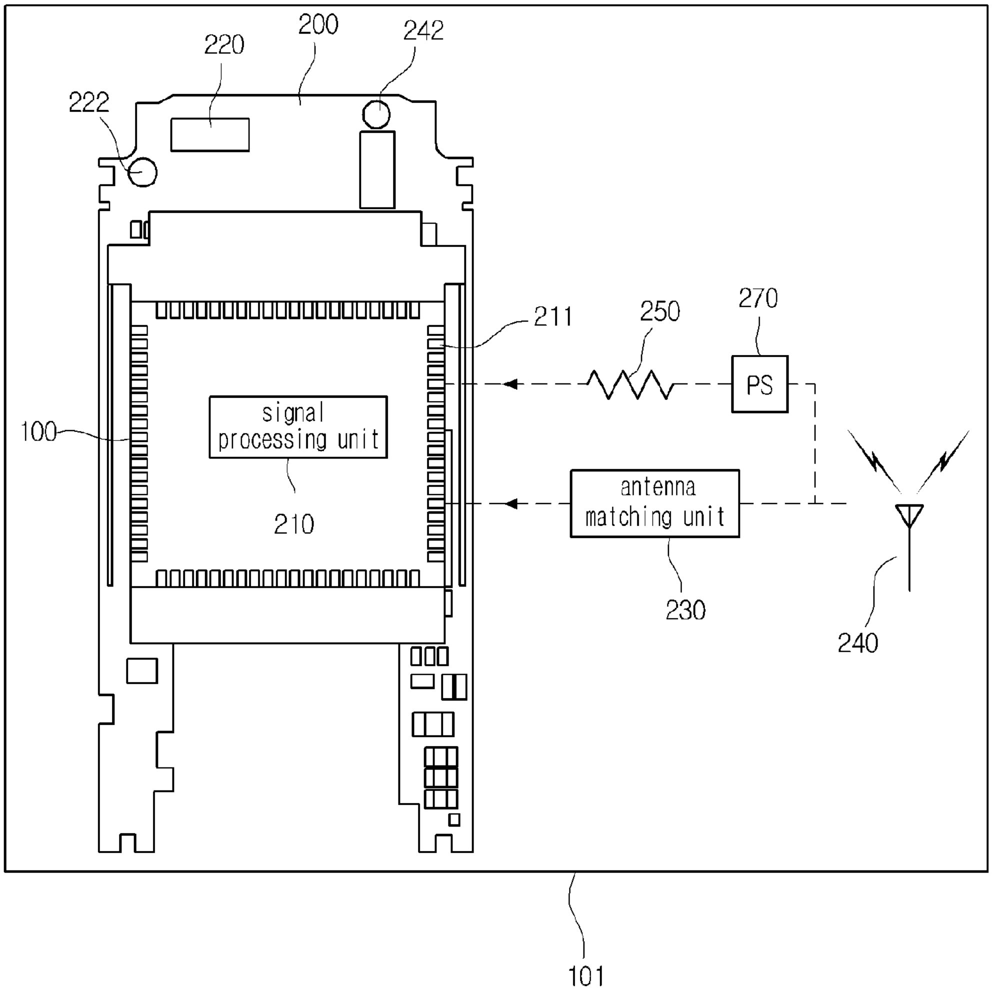
FIG. 3 is a schematic view showing the structure of a communication module of a wireless communication terminal according to one embodiment.

FIG. 3 is a schematic view showing the structure of a communication module of a wireless communication terminal 101 according to one embodiment.

As shown in FIG. 3, the wireless communication terminal 101 according to one embodiment includes the communication module having the circuit board 200 including a plurality of pins 211, the shield case antenna 100 overlapping with one side of the circuit board 200, electrically connected to a part of the pins 211 and including the signal receiving unit (not shown), the signal processing unit 210 for processing the received signals, and the antenna matching unit 230 for matching the impedance of the received signals.

In addition, communication module may further include the phase shifter 270 for adjusting the phase of the signal and the amplitude regulator 250 for adjusting the intensity of the amplitude of the signal through the resistor.

The structures of the circuit board 200 and the shield case antenna 100 have been described above, so the following description will be made while focusing on the signal input into the signal processing unit 210.

As described with reference to FIG. 2, the beam direction and shape control unit 295 is provided between the external antenna unit 240 and the signal processing unit 210 to match the impedance between the antenna unit 240 and the signal processing unit 210 and to control the amplitude and the phase of the signals received through the antenna unit 240. Hereinafter, the structure and the operation of the beam direction and shape control unit 295 will be described.

As shown in FIG. 3, the beam direction and shape control unit 295 includes the antenna matching unit 230 connected with the phase shifter 270 and the amplitude regulator 250 in parallel.

The phase shifter 270 is connected to the amplitude regulator 250 in series.

The signal processing unit 210 processes signals (not shown) received through the shield case antenna 100 and signals received through the external antenna unit 240.

The operation of FIG. 3 is substantially identical to the operation described with reference to FIG. 2.

That is, the impedance matching is performed with respect to the frequency signal received through the external antenna by the antenna matching unit so that the signal can be input into the signal processing unit through the predetermined pin without generating the reflected wave.

The phase shifter adjusts the phase of the signal received through the external antenna unit and the resistor adjusts the amplitude of the signal, so that the signal having the controlled phase and the amplitude can be input into the signal processing unit through the predetermined pin.

Figure 4:
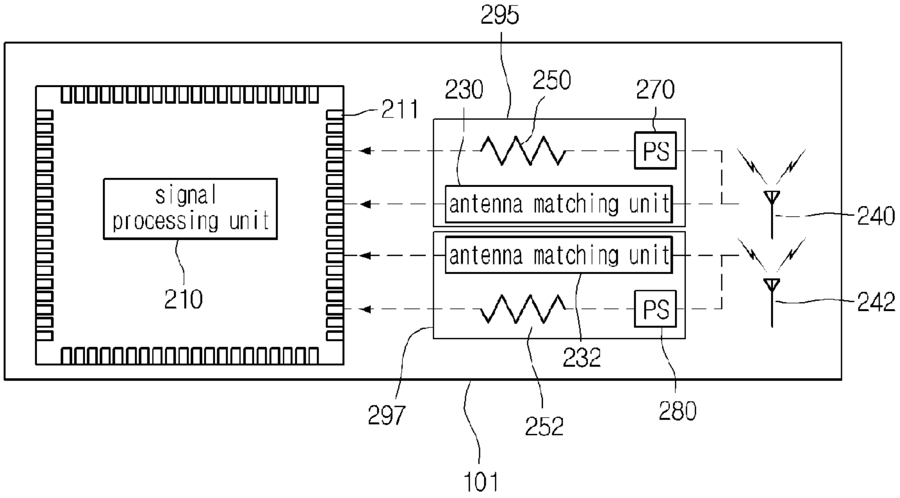
FIG. 4 is a view showing the structure of a communication module according to one embodiment.

FIG. 4 is a view showing the structure of a communication module according to another embodiment.

Referring to FIG. 4, at least to external antennas 240 may be installed in the wireless communication terminal 101.

Thus, when comparing with FIGS. 2 and 3, a beam direction and shape control unit 297 including an antenna matching unit 232, a phase shifter 280 and an amplitude regulator 252 is newly provided corresponding to an added antenna unit 242.

That is, the antenna units and the beam direction and shape control units are prepared as a pair structure, and a plurality of pair structures may be provided.

The reason to use the plural antennas is to adopt the MIMO (multi-input multi-output) scheme, which is one of multiple antenna schemes based on the OFDM (orthogonal frequency division multiplexing) scheme in the broadband wireless access system which has been recently used.

The OFDM scheme is a representative multiple sub-carrier transmission scheme for multiplexing a plurality of orthogonal sub-carriers. According to the OFDM scheme, symbol arrays input in series are converted in parallel such that the symbol arrays can be transmitted through the sub-carriers orthogonal to each other. The OFDM scheme can be extensively employed in digital transmission technologies, such as DAB (digital audio broadcasting), digital televisions, and WLAN (wireless local area network). Since the OFDM scheme has the advantage in the multipath fading, the OFDM scheme can provide the effective platform for the high-speed data transmission.

According to the OFDMA employing the MIMO, the frequency domain is divided into sub-channels consisting of a plurality of sub-carriers, and the time domain is divided into a plurality of time slots. Then, the resource allocation is performed to allocate the sub-channels to each user by taking the time domain and the frequency domain into consideration, so that a plurality of users can utilize the system based on the limited frequency resource. According to the OFDMA system, the sub-channels having sub-carriers different from each other can be allocated to various users. If AAS (adaptive antenna system), which has been suggested to increase the system capacity, is applied to the OFDMA employing the MIMO, the sub-channels can be constituted by adjacent subcarriers, so the advantage of multi-user diversity can be obtained.

In this regard, if the MIMO system is used, information can be transmitted through the spatial multiplexing, so the performance of the communication system can be remarkably improved.

Therefore, according to the embodiment, a plurality of antenna matching units 230 may be provided to support the MIMO, and the signal processing unit 210 may process a plurality of received signals such that the signals can be used in the MIMO application. Thus, the bandwidth and the transmission efficiency can be improved by about 20% as compared with the conventional bandwidth and the conventional transmission efficiency.

Figure 5:
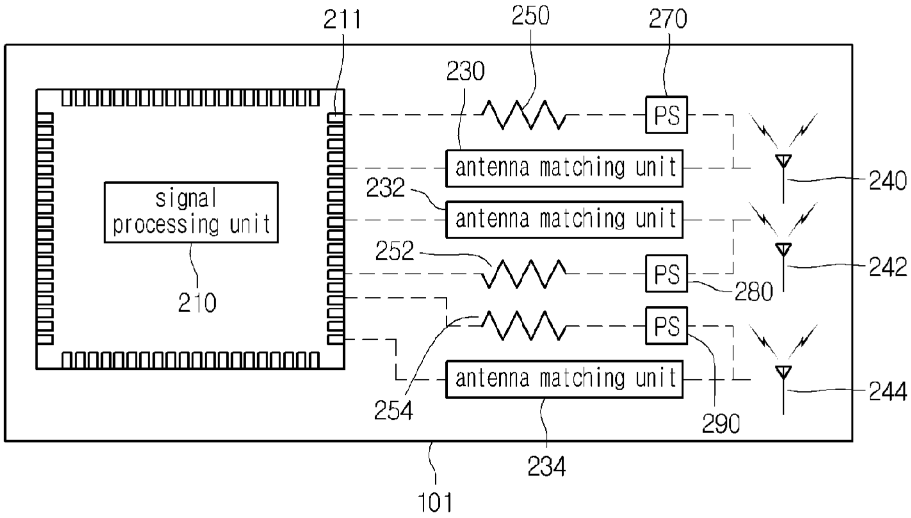
FIG. 5 is a view showing the structure of a communication module according to another embodiment.

FIG. 5 is a view showing the structure of a communication module according to still another embodiment.

As shown in FIG. 5, three external antenna units 240, 242 and 244 and components corresponding to the three external antenna units 240, 242 and 244 are prepared as a pair structure.

Through the configuration as shown in FIG. 5, the sensitivity and efficiency of the received signal can be more improved. In addition, the signal is processed in the signal processing unit 210 after the impedance matching has been performed through the antenna matching unit 230, so the transmission efficiency of the signal can be improved.

Figure 6:
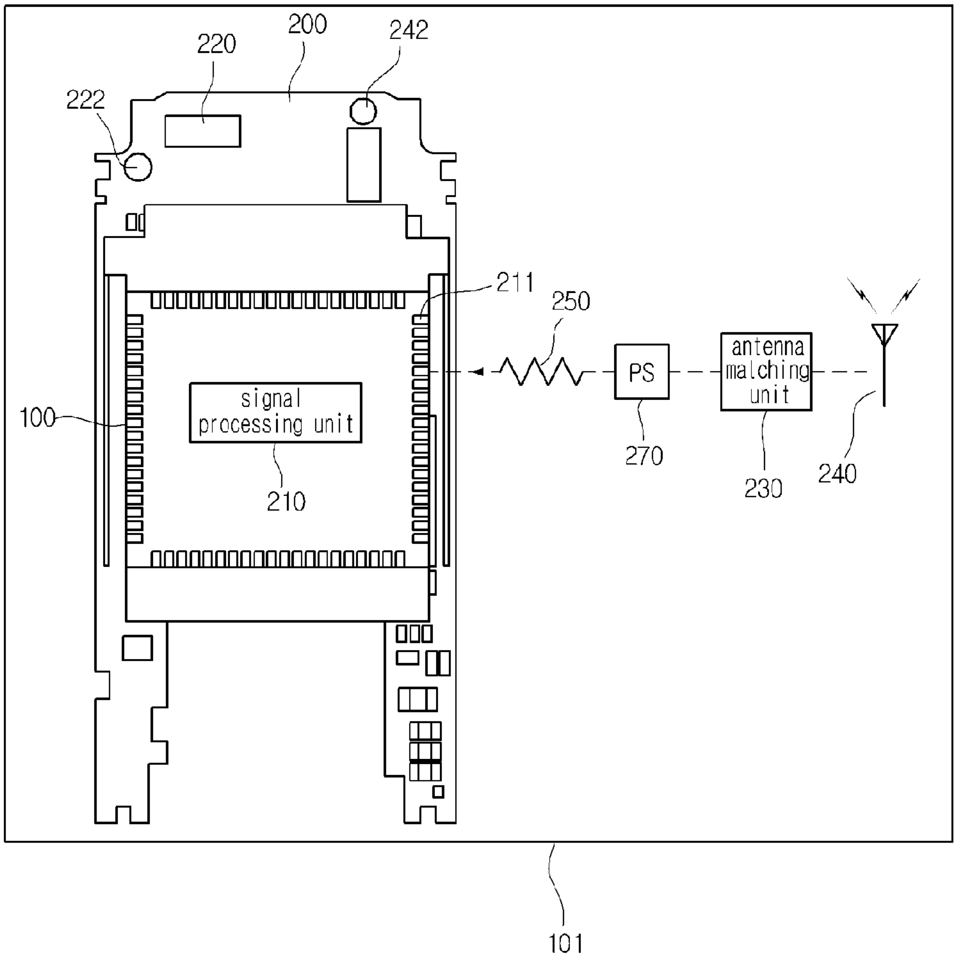
FIG. 6 is a view similar to FIG. 3, in which a resistor, a phase shifter and an antenna matching unit are connected in series and prepared as a pair structure with an antenna unit.

FIG. 6 is a view similar to FIG. 3, in which the resistor 250, the phase shifter 270 and the antenna matching unit 230 are connected in series and prepared as a pair structure with the antenna unit 240.

Figure 7:
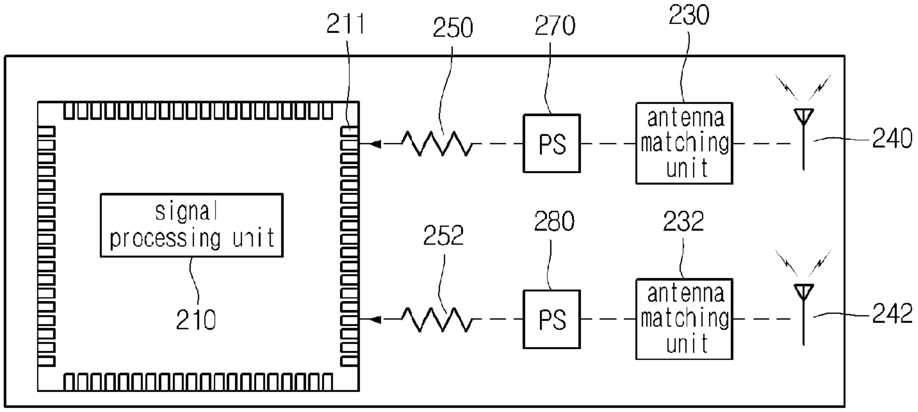
FIG. 7 is a view similar to FIG. 4, in which a resistor, a phase shifter and an antenna matching unit are connected in series and prepared as a pair structure with an antenna unit.

FIG. 7 is a view similar to FIG. 4, in which the resistor 252, the phase shifter 280 and the antenna matching unit 232 are connected in series and prepared as a pair structure with the antenna unit 242.

Figure 8:
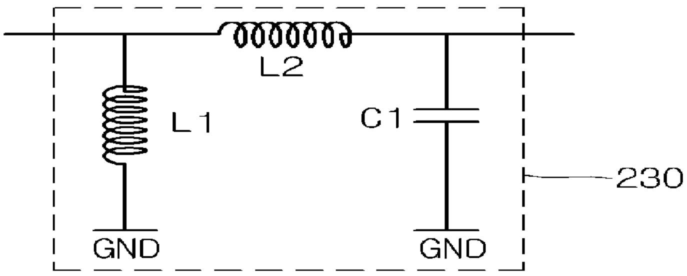
FIG. 8 is a view for explaining a circuit structure of an antenna matching unit according to one embodiment.

FIG. 8 is a view for explaining a circuit structure of the antenna matching unit 230 according to one embodiment.

In general, the impedance refers to a measure of the opposition to the flow of a current. A rig, a coaxial cable and an antenna have their own impedance value. When the impedance values of the rig, the coaxial cable and the antenna match with each other, the wave can be effectively transferred. Typically, the rig and the coaxial cable are manufactured with the fixed impedance value of 50 ohms. However, the antenna may have the impedance value other than 50 ohms. Thus, it is necessary to adjust the impedance value of the antenna approximately to 50 ohms and this procedure is called 'impedance matching'. The VSWR (voltage standing wave ratio) represents the degree of the impedance matching. The VSWR has the value of at least 1, and the wave can be effectively transferred and the rig damage can be diminished as the VSWR approximates to 1.

The antenna matching unit 230 may be a pie-type matching circuit consisting of passive elements including inductors L1 and L2 and a capacitor C1 as shown in FIG. 8. The antenna matching unit 230 can be designed such that the impedance thereof can match with the impedance of the circuit including the signal processing unit by appropriately adjusting the size of the inductors L1 and L2 and the capacitor C1.

Figure 9:
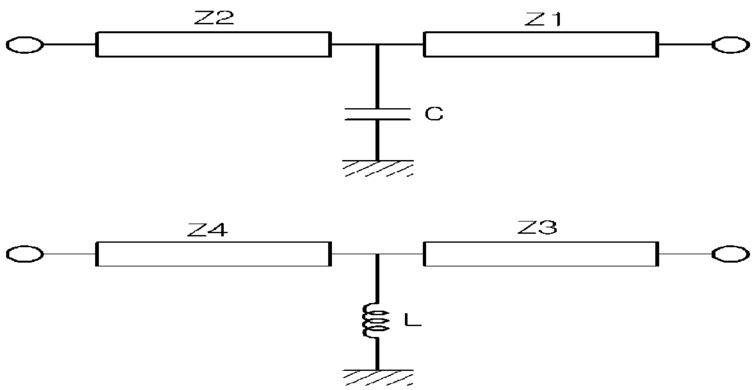
FIG. 9 is a view showing one example of a phase shifter.

FIG. 9 is a view showing one example of a phase shifter.

As shown in FIG. 9, the phase can be shifted by connecting various circuit elements to the middle of the transmission path having the characteristic impedance of 50 ohms.

Figure 10A:
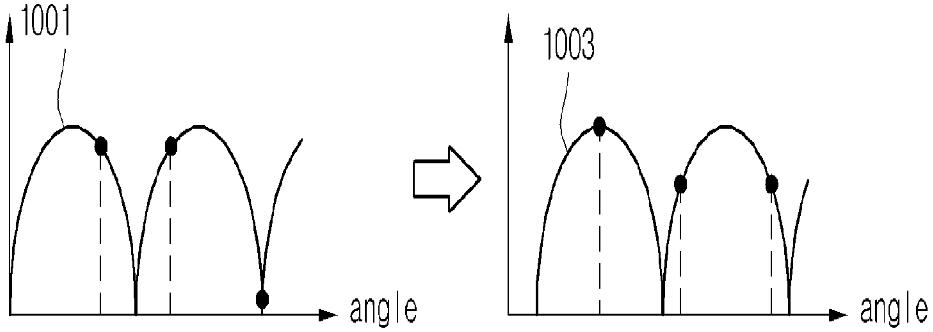
FIGS. 10*a* and 10*b* are views showing waveforms of a signal received through an antenna and controlled by a phase shifter and an amplitude regulator.
Figure 10B:
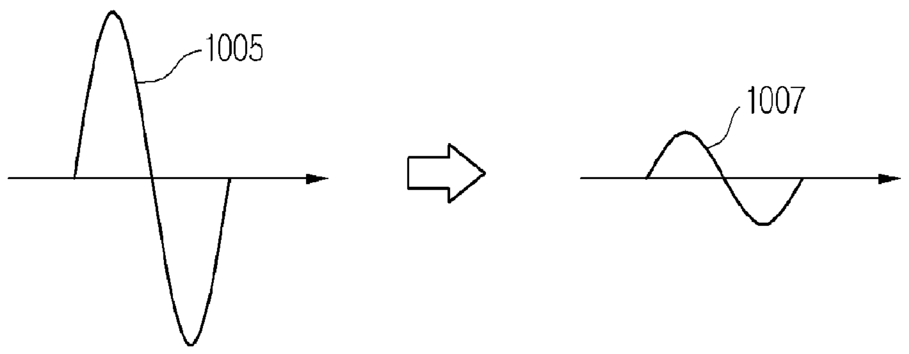

FIGS. 10*a* and 10*b* are views showing waveforms of a signal received through an antenna and controlled by the phase shifter and the amplitude regulator.

As shown in the drawings, the position of the phase is controlled (from 1001 to 1003) by the phase shifter.

In addition, the size of the amplitude is controlled (from 1005 to 1007) by the resistor 250.

Figure 11:
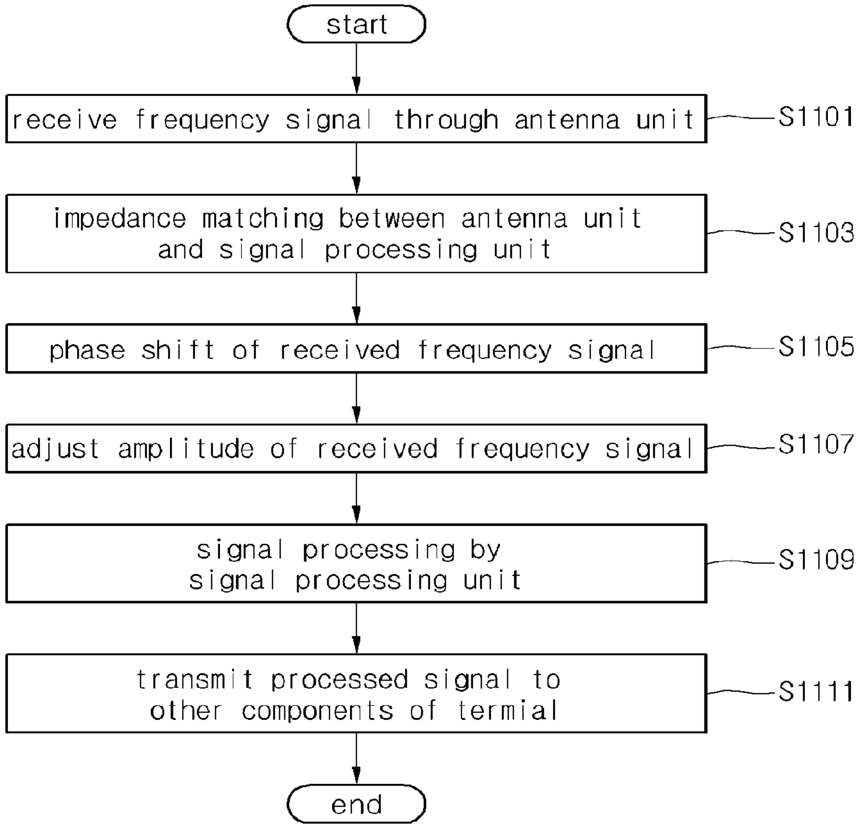
FIG. 11 is a flowchart showing a method of processing a signal received through an external antenna.

FIG. 11 is a flowchart showing a method of processing a signal received through an external antenna.

As shown in FIGS. 2 and 3, the signal is received through the antenna unit 240 (S 1101).

Then, the impedance matching is performed between the antenna unit 240 and the signal processing unit 210 by the antenna matching unit 230. At this time, in general, the impedance of the antenna unit is adjusted (S 1103).

In addition, the phase of the signal received through the antenna unit is shifted by the phase shifter 270 and the amplitude of the signal is controlled by the amplitude regulator 250 as shown in FIGS. 10*a* and 10*b* (S 1105 and S 1107).

The controlled signal is processed by the signal processing unit and then transmitted to other components of the terminal (S 1105 and S 1107).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal comprising multi-antennas, the terminal comprising:
- an antenna unit to receive a signal;
- a signal processing unit to process the received signal; and
- a beam direction and shape control unit provided between the antenna unit and the signal processing unit,
- wherein the beam direction and shape control unit comprises:
  - an antenna matching unit to match an impedance between the antenna unit and the signal processing unit;
  - a phase shifter to shift a phase of the received signal; and
  - an amplitude regulator to adjust an amplitude of the received signal,
  - wherein the antenna matching unit and the phase shifter are connected with each other in parallel.

2. The terminal of claim 1, wherein a signal which is impedance-matched through the antenna matching unit is input into the signal processing unit.

3. The terminal of claim 1, wherein the phase shifter and the amplitude regulator are connected to each other in series.

4. The terminal of claim 1, wherein the antenna matching unit and the amplitude regulator are connected with each other in parallel.

5. The terminal of claim 1, wherein the antenna unit and the beam direction/shape control unit are configured as a pair structure.

6. The terminal of claim 1, wherein the antenna unit and the beam direction/shape control unit are configured as a plurality of pair structures to implement MIMO (multi-in multi-out).

7. The terminal of claim 5, wherein the received signal is input into the signal processing unit after being controlled through the antenna matching unit, the phase shifter and the amplitude regulator.

8. A method of processing a signal in a terminal, the method comprising:

receiving, by an antenna unit, a signal;

matching, by an antenna matching unit, an impedance between the antenna unit and a signal processing unit;

shifting, by a phase shifter, a phase of the received signal;

adjusting, by an amplitude regulator, an amplitude of the received signal; and processing, by the signal processing unit, the received signal, wherein the antenna matching unit, the phase shifter and the amplitude regulator are provided between the antenna unit and the signal processing unit, and wherein the antenna matching unit and the phase shifter are connected with each other in parallel.

9. The method of claim 8, wherein the phase shifter and the amplitude regulator are connected to each other in series.

10. The method of claim 8, wherein the antenna matching unit and the amplitude regulator are connected with each other in parallel.

* * * * *